(12) United States Patent  (10) Patent No.: US 7,815,041 B2
Guenther  (45) Date of Patent: Oct. 19, 2010

(54) CONVEYOR LINE WITH AN ADJUSTABLE RAILING AND AN ACTUATOR DRIVE

(75) Inventor: Rauscher Guenther, Pfatter-Geisling (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 10/511,819

(22) PCT Filed: May 7, 2004

(86) PCT No.: PCT/EP2004/004872

§ 371 (c)(1),
(2), (4) Date: Apr. 28, 2005

(87) PCT Pub. No.: WO2004/099042

PCT Pub. Date: Nov. 18, 2004

(65) Prior Publication Data

US 2007/0114112 A1  May 24, 2007

(30) Foreign Application Priority Data

May 9, 2003 (DE) ................................. 103 21 133

(51) Int. Cl.
*B65G 21/20* (2006.01)
(52) U.S. Cl. ............... 198/836.3; 198/861.1; 198/836.1
(58) Field of Classification Search .............. 198/345.1, 198/836.3, 636.3
See application file for complete search history.

(56) References Cited

U.S. PATENT DOCUMENTS

| 5,211,280 | A | | 5/1993 | Houde |
| 5,542,789 | A | * | 8/1996 | Aidlin et al. ................... 406/88 |
| 6,305,528 | B1 | * | 10/2001 | Leonard .................. 198/836.3 |
| 6,318,935 | B1 | * | 11/2001 | Ouellette ...................... 406/83 |
| 6,368,027 | B1 | * | 4/2002 | Trenel et al. ................... 406/87 |
| 6,382,882 | B1 | | 5/2002 | Ouellette |

FOREIGN PATENT DOCUMENTS

| DE | 4330702 A1 | 3/1995 |
| DE | 69709943 T2 | 8/1999 |
| EP | 1 277 677 A1 | 1/2003 |
| EP | 1277677 A1 | 1/2003 |
| JP | 56-152518 A | 11/1981 |

* cited by examiner

*Primary Examiner*—Gene Crawford
*Assistant Examiner*—Kavel P Singh
(74) *Attorney, Agent, or Firm*—Marshall, Gerstein & Borun LLP

(57) ABSTRACT

A conveyor line for products such as bottles, cans or similar containers with at least one guide railing that is adjustable across the direction of conveyance and is operable by at least one actuator drive, whereby stops which can optionally be moved into several preset positions in the adjustment path of the guide railing or the at least one actuator drive which define various railing positions and thereby delineate the adjustment path.

49 Claims, 4 Drawing Sheets

CONVEYOR LINE WITH AN ADJUSTABLE RAILING AND AN ACTUATOR DRIVE

FIELD OF THE INVENTION

This invention relates to a conveyor line for products such as bottles, cans or similar containers and to an actuator drive for such a conveyor line.

BACKGROUND

Adjustable railings on conveyor lines for bottles or similar containers are known for adjusting the conveyor width, i.e., the spacing between railings on containers of different diameters (German Patent DE 43 30 702 A1, German Patent DE 697 09 943 T2, U.S. Pat. No. 6,382,882 B1). These railings are used to guide the containers laterally in a path and to prevent them from getting out of line across the direction of conveyance, which can lead to blockages in congested situations. In the known cases, adjustment of the railing is implemented by means of pneumatic cylinders, the end positions of which can define only two different positions. Furthermore, it is known that multiple pneumatic cylinders may be linked together to create more than two positions. The solution requires extensive assembly work, takes up a lot of space and causes a great complexity in terms of the control technology.

SUMMARY OF THE DISCLOSURE

The object of this disclosure is to provide an adjustable railing and an actuator drive for it to allow a lateral adjustment and accurate fixation of different predefinable positions with a simple structural design.

For each product shape to be processed, a preset stationary position is provided for a stop, which can be moved either manually or by control means from a readiness position into or out of a working position which blocks the adjustment pathway of the guide railing or the actuator drive that operates the railing. In the ideal case, each position is assigned its own stop, which is movable back and forth between the aforementioned two positions and can be brought into contact with an opposing stop, which follows the adjusting movement.

However, a smaller number of stops may be sufficient if they can be moved either manually or by control means, e.g., by a manipulator, into various positions which determine the position of the railing. In the case of a manual adjustment of stops, it is advantageous to provide a code which is assigned to different product shapes and indicates the respective positions, e.g., with colors or other suitable markings The railings can be fixed in a position which corresponds to a largest and a smallest product shape by just two stops which can be handled adequately manually, regardless of the end positions of the actuator drive used which are predetermined by the design. For other product shapes, which require positions in between these two extremes, stops that are operated by a control means are advantageous because then at least three different positions of the railings can be set and changed quickly without manual intervention, in particular when a controller is used, preferably a programmable controller, for the actuator drives and the stops which can be operated by control means. Then the format can be changed quickly and automatically by a control command.

According to a preferred embodiment, the actuator drive for the adjustment of the railing is a linear drive. Its axis of adjustment is ideally arranged to run at a right angle to the direction of conveyance of the conveyor line so that it may at the same time as a railing mount or carrier. The preset positions for the stops are arranged in stationary positions in the adjustment pathway of the linear drive or the railings along the axis of adjustment. A direct allocation of the positions to the linear drive, e.g., by a stop mount that determines the positions, is particularly advantageous. It may be designed as an integral component or as an attachment to the linear drive whose position in relation to the linear drive can be secured immovably.

An especially inexpensive embodiment of a linear drive is a preferably double action pneumatic cylinder with a cylinder element and a piston guided so that it is coaxially displaceable therein and has a piston rod, whereby one component of the stop mount forming the cylinder housing is set so that it is aligned in the axial direction with the cylinder element, with an axial bore passing through the lengthened piston rod. The diameter of this axial bore is advantageously selected to be greater than the outside diameter of the piston rod, forming an annular space with stops passing through it. In the area of the axial bore, there is an opposing stop which is connected to the piston rod in terms of movement, preferably having a disk-shaped contour and an outside diameter that corresponds approximately to the inside diameter of the axial bore. If the length of the axial bore corresponds at least to the maximum adjustment pathway of the pneumatic cylinder, then the entire adjustment pathway is available for positions that are designed to accommodate stops and can be preset in advance.

These positions are preferably designed as recesses, in particular boreholes running across the adjustment path and/or the axial bore. They may be designed to run at a right angle from one side of the lateral surface of the stop mount continuously to the opposite side of the lateral surface of the annular space. A nail-shaped pin, for example can be inserted in a form-fitting manner into such a borehole as a stop body which passes through the annular space and protrudes into the path of travel of the opposing stop. Multiple bores may also be arranged in a row running along the adjustment path or may even be arranged in multiple parallel rows, thus making it possible to implement a spacing offset between the bore rows with positions for stops very close together in the axial direction. The entire circumference of the lateral surface of the stop mount is available for this. Thus any position can be preset at intervals of 2.5 mm, for example. By using plug elements, it is possible for all positions to be occupied in the ideal case. This yields the possibility of adjusting the railing positions across the direction of conveyance to fit a variety of product sizes.

This solution allows a very compact, mechanically simple and thus inexpensive design of an actuator drive which takes up slightly more length only in the axial direction in comparison with a conventional pneumatic cylinder.

In addition to the boreholes mentioned above, other possible stop positions such as notches, grooves, slots or the like may also be provided on the body of the stationary stop mount. Likewise, all bodies suitable for this purpose, e.g., screws, needles, disks, rings or other elements may be used as stops.

BRIEF DESCRIPTION OF THE DRAWINGS

An exemplary embodiment is described below on the basis of the figures, which show.

DETAILED DESCRIPTION OF THE DISCLOSURE

Figure 1:
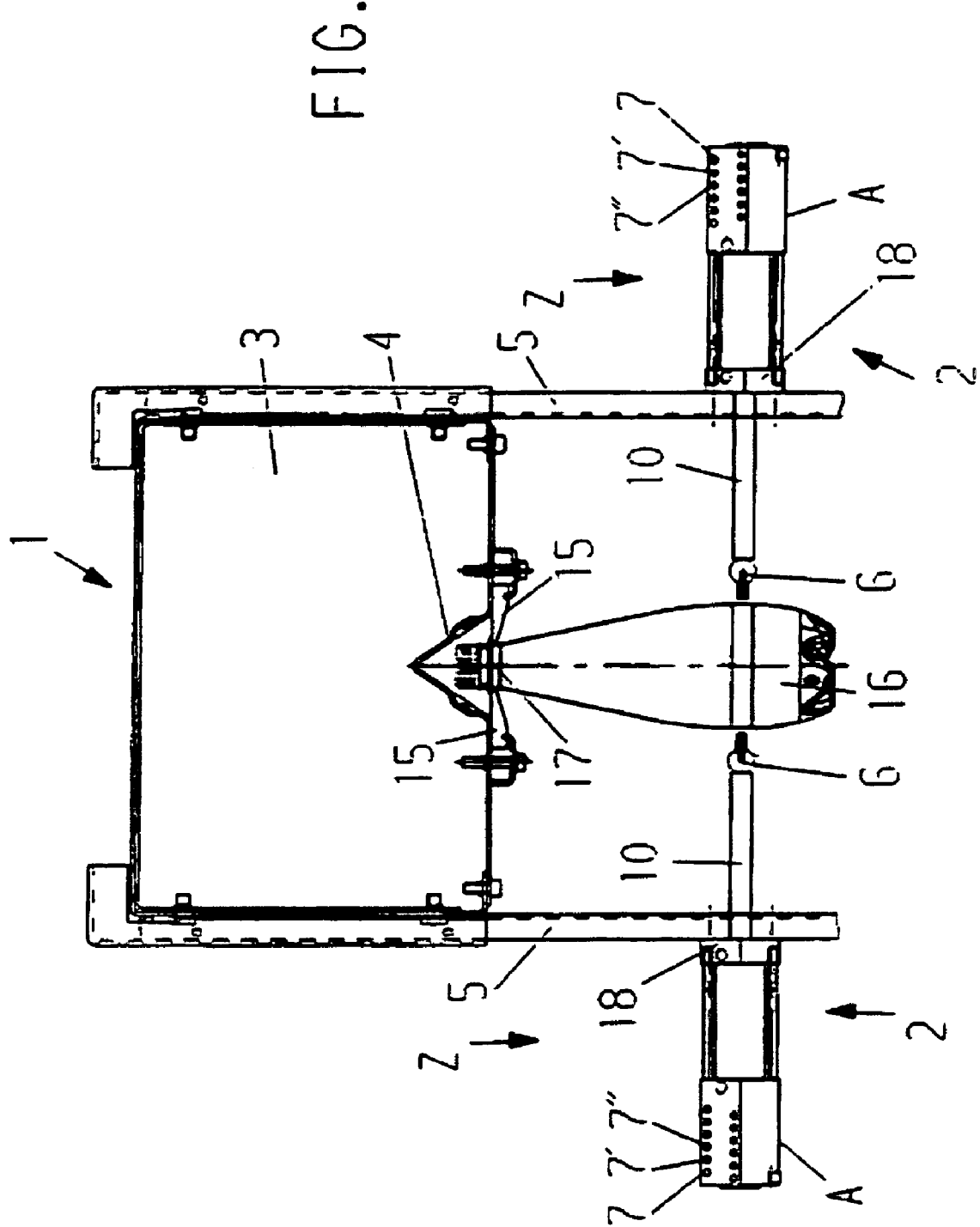
FIG. 1 a vertical section through a pneumatic conveyor.

FIG. 1 shows a vertical section through a pneumatic conveyor 1 as seen in the direction of conveyance, transporting bottles 16 on a carrying ring 17 so that they are suspended, with actuator drives 2 fixing the position of the guide railings 6 which run parallel with an intermediate spacing between them. The actuator drives 2 are each mountable in a fixed position in relation to the frame with a flange plate 18 on vertical supports 5. The flange plate 18 has fastening boreholes 19 with which it is attached to the vertical supports 5. Elongated holes are preferably provided in the vertical supports 5 to permit a height adjustment of the actuator drive 2 with the guide railings 6 mounted directly on the supports with a variation in the bottle height.

The pneumatic conveyor 1 has essentially a closed approximately U-shaped air guidance box 3 which is supported by vertical supports (not shown in detail), and which is constantly supplied with air in an essentially known manner by multiple blowers (not shown) arranged so they are offset in the direction of conveyance. A roof-shaped nozzle channel 4 which is provided on the underside of the air guidance box 3 has two sliding rails 15 running in parallel beneath it, gripping the supporting rings 17 of the plastic bottles from underneath, the cross section of this nozzle channel being of dimensions such that the head area of a bottle 16 has room to move on all sides.

On both sides of the air guidance box 3, the vertical supports 5 at regular intervals in the direction of conveyance extend downward, with guide railings 6 that run parallel to the direction of conveyance being supported in a laterally adjustable manner over the actuator drives 2 mentioned above. These railings 6 which are arranged in opposing pairs at the same height together with the sliding rails 15 which guide the head area of the bottles form a guidance channel, which prevents a lateral pendulum movement or swerving of the bottles 16.

The guide railings 6 are mounted across the direction of conveyance at a distance which is slightly greater than the diameter of the bottles 16 to be transported: to support the guide railings 6, the actuator drives 2 are mounted on the vertical supports 5 at a right angle with respect to their axis of adjustment, such that stop mounts A with preset positions 7, 7', 7", etc. and stops 8a, 8b, 8c which can be introduced into them are provided on the outside facing away from the articles 16. The piston rod 10 of the actuator drive 2 which is designed as a linear pneumatic cylinder is aligned horizontally here.

Figure 2A:
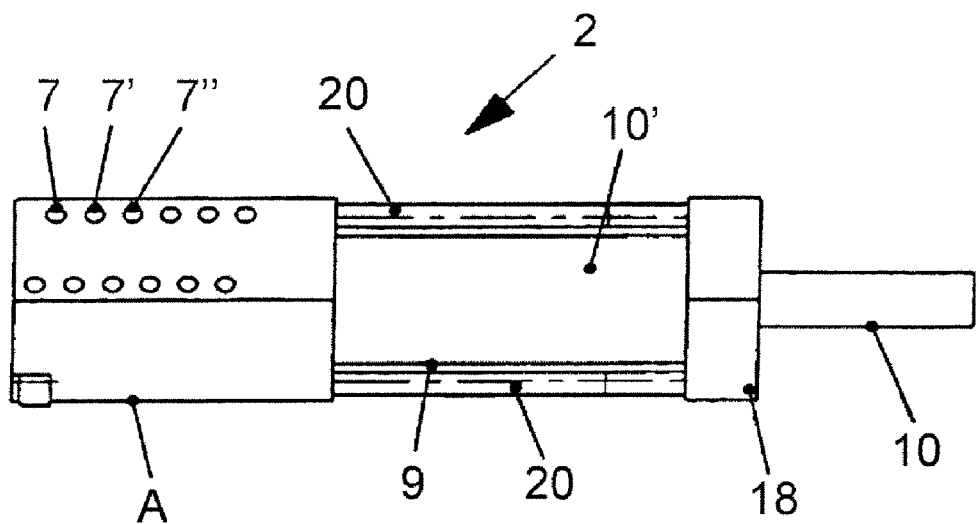
FIG. 2a a control cylinder with a stop mount.

FIG. 2a shows a pneumatic actuator drive 2 which consists of a cylinder body 9 and a piston rod 10 which is guided coaxially in it and has an attached piston 10'. Its end positions define a maximally available adjustment path S which the piston rod 10 may travel (see FIG. 2b). The stop mount A which engages in a form-fitting manner in the cylinder body 9 is mounted on one end of the cylinder body 10 by means of a centering shoulder 12. The stop mount A is connected axially via the tension anchor 20 to the flange plate 18 which is positioned on the opposite end of the cylinder body 9. The mounting boreholes 19 mentioned above are incorporated into the flange plate 18, serving to securely clamp the actuator drive 2 with screws on the vertical supports 5 which have slots for free passage of the piston rod 10 to the railings 6. The flange plate 18 has a centered borehole which is not shown in detail here and in which the piston rod 10 is guided axially.

Figure 3:
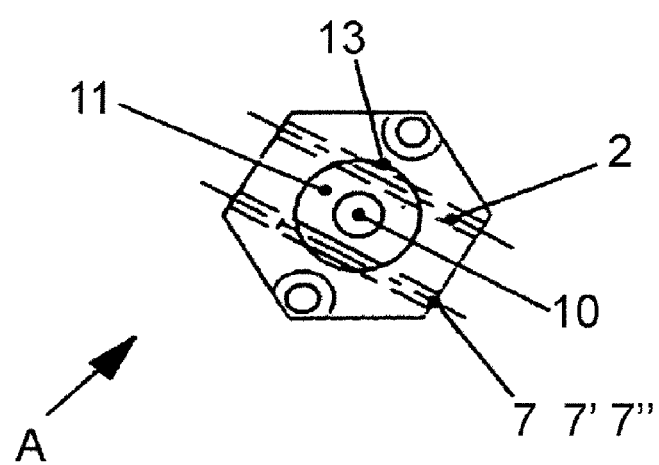

The stop mount 8 is preferably designed as a hexagonal profile (shown in FIG. 3). Preset positions 7, . . . , 7"" in the form of through-holes, threaded holes or other recesses are provided on two opposing parallel faces of the stop mount A. It is possible to introduce the preset positions 7, etc. on all six sides of the stop mount A, e.g., in the form of rows of holes. They are, for example, designed in two parallel rows which may be arranged so they are offset with respect to one another by half the standard spacing to obtain a tightly graduated position grid.

Figure 2B:
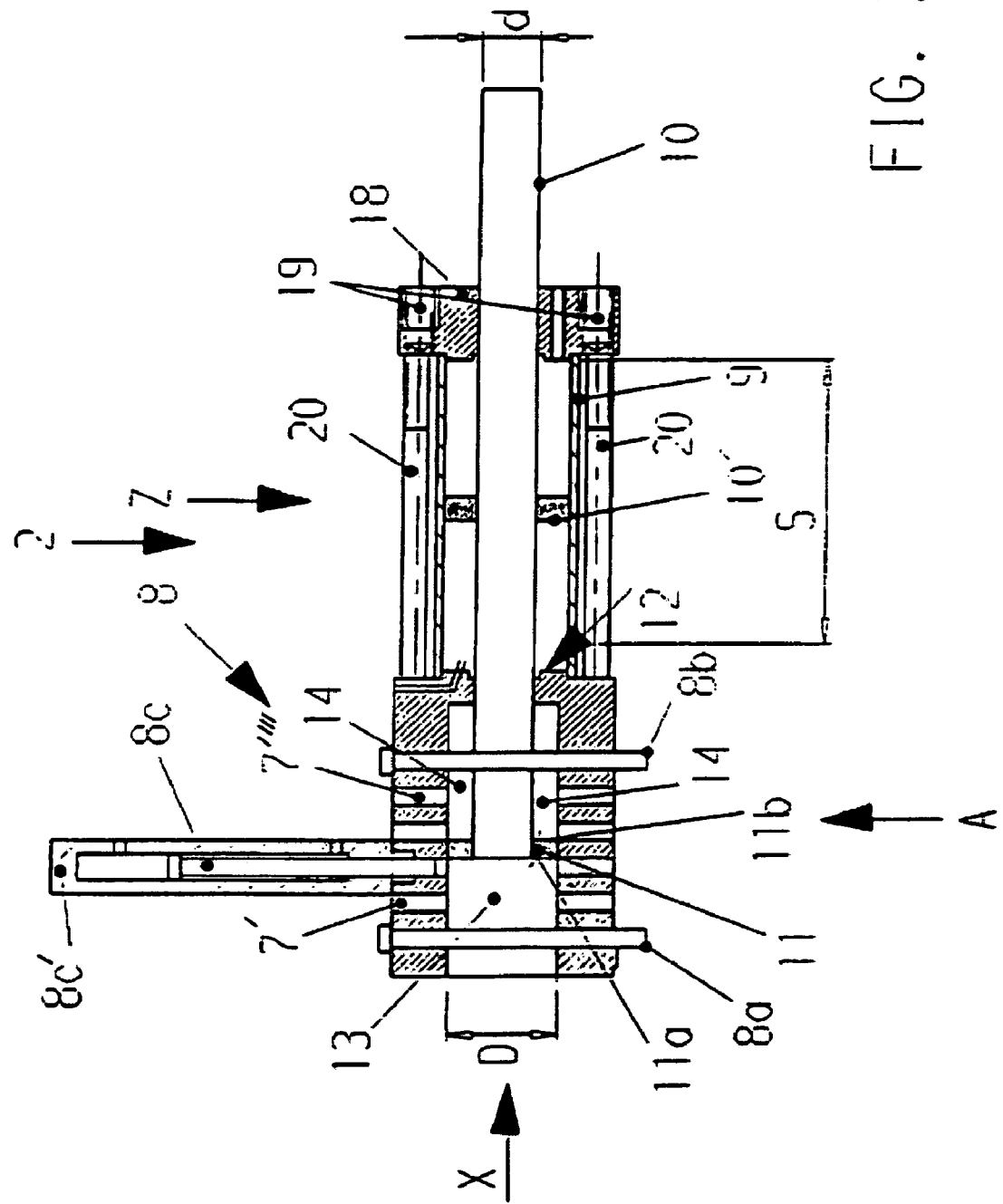
FIG. 2b a vertical longitudinal section through a control cylinder according to FIG. 2a with stops for defining positions, FIG. 3 a side view of a stop mount as seen from direction X in FIG. 2b and FIG. 4 a vertical section through a pneumatic conveyor with guide railings that are adjustable in height.

FIG. 2b shows a vertical longitudinal section through the actuator drive 2 in which an axial bore 13 is visible through the stop body A. The inside diameter D of the borehole 13 is greater than the outside diameter d of the piston rod 10. This forms an annular space 14 in the interior of the stop mount A through which the stops 8a, 8b, 8c may extend (e.g., pins with heads). Furthermore, this figure shows the stops 8a, 8b, 8c in preset positions 7, etc. which can be brought to rest against an opposing stop 11 on the piston rod 10. The opposing stop 11 has two faces 11a, 11b which face away from one another. In this case it is designed in the form of a washer which is secured on the piston rod. The diameter of the plate that is bolted on is slightly smaller than the inside diameter D of the axial bore 13 of the stop mount A. The preset positions, i.e., bores 7, 7', 7", etc. are designed continuously over the entire cross section of the stop mount A. In the set position of the stops 8a, 8b, 8c, they pass through the entire stop mount A. The bores thus ensure guidance of the stops 8a, 8b, 8c on both ends. The precise guidance of the stops 8a, 8b, 8c which are designed in the form of pins, needles or the like, ensures a precisely adjustable positioning of the railings 6.

The stops 8a and 8b which can be seen in FIG. 2b are in the working position, i.e., in the traversing path of the opposing stop 11, while the stop 8c assumes a position of readiness outside of the traversing path. The stop 8c is displaceably guided in a cylinder housing 8c' which is screwed at a right angle into the stop mount A, forming together with the latter a double-acting pneumatic cylinder in a miniature design, i.e., this stop, like the actuator drive 2, can be acted upon alternately with compressed air in a known manner via a control means and electromagnetic valves (not shown), e.g., in a program-controlled process, and thereby moved in opposite directions. In its working position, it can optionally be brought into engagement with one of the two stop faces 11a, 11b on the opposing stops which face away from one another so that with the three stops shown, a total of four different preset railing positions are already possible even without changing the stops manually.

FIG. 3 shows a side view of the stop mount A as seen from direction X, the stop mount being mounted on the cylinder body 9 shown in FIGS. 2a and 2b. An annular space 14 which is formed by an axial bore 13 in the interior of stop mount A and piston rod 10 is also visible. This view shows, first, the hexagonal shape of the stop mount A which has already been described and, second, the embodiment of the preset positions 7, 7', 7", etc. designed in the form of through-holes with the entire arrangement passing through the entire body. In the retracted state the stops 8a, 8b, 8c pass through the annular space 14 at a right angle to its longitudinal extent and can be brought to rest against the opposing stop 11 in this traversing movement.

Figure 4:
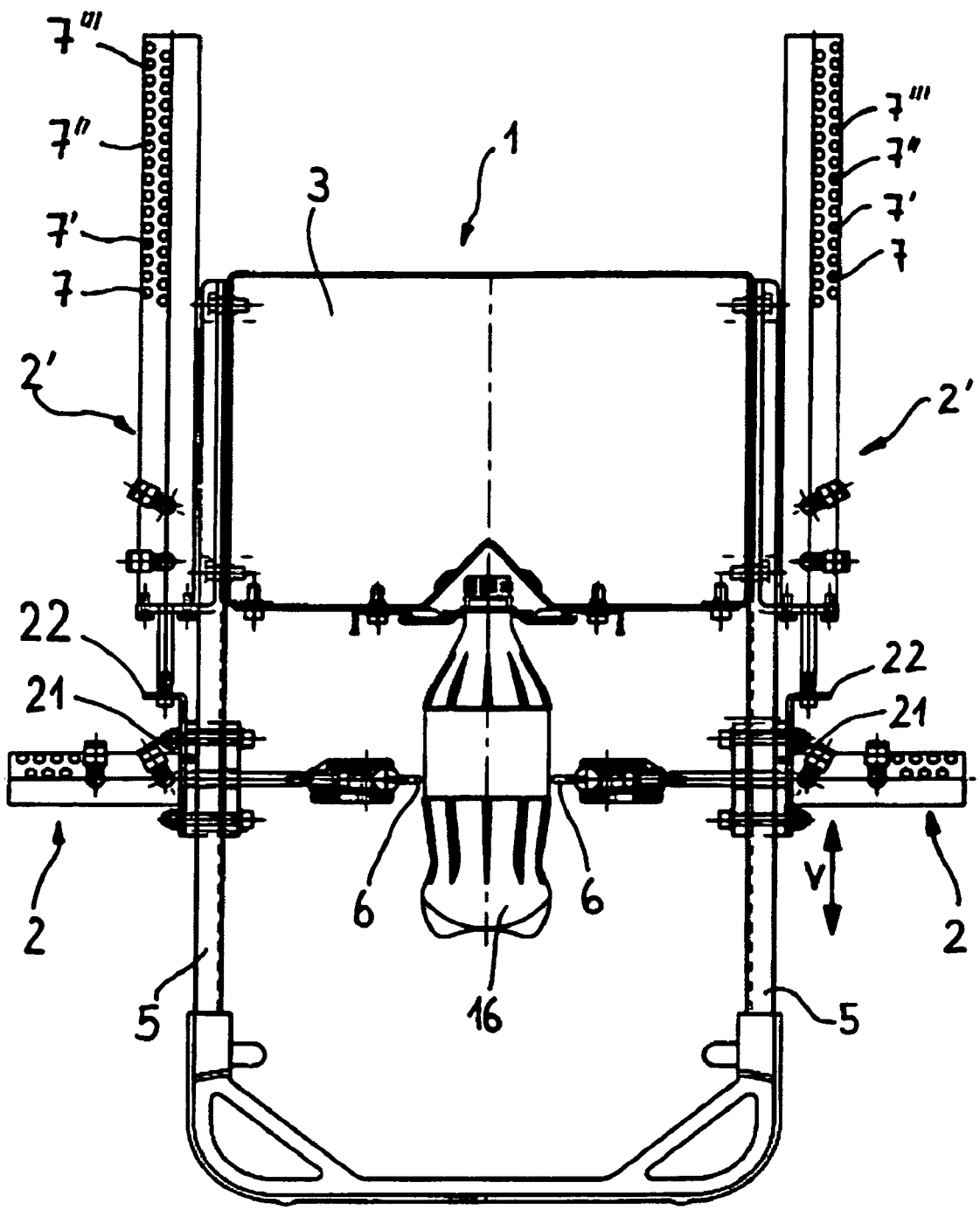

FIG. 4 shows an advantageous refinement of the railing adjustment which is illustrated in FIG. 1 and has a manual height adjustment, while the embodiment shown here permits an adjustment of the height position of the railing to accommodate different bottle heights in an at least partially automated form. The actuator drives 2 which move the guide railings permit a horizontal adjustment across the direction of conveyance and are each mounted on a sliding piece 21 that is guided displaceably axially along a vertical support 5. The sliding piece 21 has an angle 22 with a leg running horizontally, the piston rod of an actuator drive 2' being attached to the leg and aligned vertically, i.e., parallel to the longitudinal extent of the vertical support. This actuator drive 2' may have the same design as the actuator drives 2 shown in FIGS. 1 through 3. In FIG. 3 the stop mounts and the actual cylinders are designed in one piece to be made of a hexagonal material. If necessary, the actuator drive 2' has a greater maximum adjustment path because a greater bandwidth may be necessary for an adjustment of the guide railings longitudinally to the axis of the bottle than for an adjustment across the axis of the bottle, i.e., the actuator drive 2' may be designed to be longer on the whole and to have more preset positions 7, . . . , 7''' accordingly for attaching stops. These stops may be designed like those in FIG. 2b as manually adjustable pins or the like and/or as remote-controlled stops in the form of miniature pneumatic cylinders, magnetically operable stops or those operable by some other form of motor drive, thus permitting an especially convenient, fast and simultaneous means of performing adjustments of both the height and transverse positions of the guide railing 6 of a complete conveyor system when there is a change of types of bottles processed and this makes it possible to perform these adjustments from a central location. Actuator drives 2 and 2' as well as the remote controlled stops (miniature pneumatic cylinder 8c) can be triggered in the correct order of operation. To do so, pneumatic valves that can be operated by hand from a central location may be provided. However, it is especially advantageous to have a central control which is operable via a programmable controller whose program memory contains a type selector switch or a switching program that can be called up for each type of bottle to be processed such that this program need be installed only once and thereafter executes a switch in type of bottle processed on a fully automatic basis.

The invention claimed is:

1. Conveyor line for products such as bottles, cans or similar containers, comprising:
   at least one guide railing which is adjustable along an adjustment pathway across a direction of conveyance and is operable by at least one actuator drive, the guide railing being adjustable across a longitudinal axis of each of the products;
   a plurality of movable stops that are optionally introducible at one or more preset positions in the adjustment pathway of the guide railing to delimit the at least one guide railing and define various railing positions, at least one of the movable stops disposed within a cylinder housing that is disposed at a right angle to the actuator drive; and
   control means for moving the movable stop in the cylinder housing between a position of readiness outside of the adjustment pathway and a working position inside the adjustment pathway for delimiting the adjustment of the guide railing.

2. Conveyor line according to claim 1, wherein at least two stops are provided.

3. Conveyor line according to claim 1, wherein the actuator drive includes one opposing stop operably connected to the guide railing, and which can be brought into contact with the plurality of stops and follows the adjusting movement arranged on one of the guide railing or the actuator drive.

4. Conveyor line according to claim 3, wherein the opposing stop has at least two stop faces facing away from one another as based on the adjustment pathway.

5. Conveyor line according to claim 3, wherein the actuator drive is a linear drive and the preset positions are assigned to the linear drive.

6. Conveyor line according to claim 5, wherein the linear drive is a double-acting pneumatic cylinder having a cylinder element which has a cylinder body and a piston rod.

7. Conveyor line according to claim 6, wherein the preset positions assigned to the linear drive comprises a stop mount attached to the cylinder element of the pneumatic cylinder in the axial direction.

8. Conveyor line according to claim 7, wherein the preset positions comprise multiple bores in the stop mount set along the adjustment pathway in the axial direction.

9. Conveyor line according to claim 8, wherein the stop mount has an axial bore aligned with the cylinder body.

10. Conveyor line according to claim 9, wherein the bore is arranged coaxially with the piston rod and the piston rod passes at least partially through the bore.

11. Conveyor line according to claim 9, wherein the inside diameter of the bore is greater than the outside diameter of the piston rod, thus forming an annular space.

12. Conveyor line according to claim 11, wherein the bores for accommodating the stops are assigned to the annular space so that the stops pass through the annular space approximately at a right angle to the longitudinal extent of the annular space when in the position of readiness or the working position.

13. Conveyor line according to claim 8, wherein the four of the multiple bores in the stop mount comprises at least two rows with an arrangement of bores offset in the axial direction of the stop mount.

14. Conveyor line according to claim 7, wherein the stops can be screwed into threaded bores in the stop mount.

15. Conveyor line according to claim 7, wherein the stop mount has a centering shoulder which engages in the cylinder body in a form-fitting manner.

16. Conveyor line according to claim 7, wherein the opposing stop is attached to the piston rod and is guided in the interior of the stop mount.

17. Conveyor line according to claim 7, wherein the opposing stop is displaceable with the piston rod over the entire length of the adjustment path in the stop mount.

18. Conveyor line according to claim 1, wherein the preset positions comprise recesses.

19. Conveyor line according to claim 18, wherein the recesses comprise bores into which the stops can be inserted in a form-fitting manner.

20. Conveyor line according to claim 1, wherein the plurality of stops comprise form-fitting plug or screw elements.

21. Conveyor line according to claim 20, wherein the one of form-fitting plug or screw elements comprise pins.

22. Conveyor line according to claim 1, wherein each of the plurality of stops comprises a pneumatic cylinder that can be operated by the control means.

23. Conveyor line according to claim 1, wherein the adjustable guide railings are arranged so they run opposite one another in pairs and parallel to the direction of conveyance with a distance between the pairs.

24. Conveyor line according to claim 1, wherein the products to be transported have a collar by means of which they are transported suspended on two parallel sliding rails which run with a distance therebetween.

25. Conveyor line according to claim 24, wherein the sliding rails are mounted in such a way that the products are conveyed as suspended items beneath an air guide box.

26. Conveyor line according to claim 24, wherein the products to be transported are bottles having a collar.

27. Conveyor line according to claim 1, wherein the guide railing is operable so that it is adjustable in height by at least one actuator drive longitudinally to the vertical axis of the products being conveyed, with stops which may optionally be arranged in the adjustment path at multiple preset positions and delineate said path on the vertical adjustment path of the guide railing or the at least one actuator drive and thereby define various railing positions.

28. Conveyor line according to claim 1, wherein the actuator drive is a linear drive formed as a double-acting pneumatic cylinder having a cylinder element which has a cylinder body and a piston rod and where the preset positions are assigned to the linear drive and formed as a stop mount attached to the cylinder element of the pneumatic cylinder in the axial direction.

29. An actuator drive for actuating and positioning adjustable guide railings on conveyor lines for products such as bottles, cans or similar containers, the actuator drive comprising:
a stop body defining an adjustment path for at least one of the guide railings, and a plurality of preset positions in the adjustment path;
a plurality of movable stops which can be arranged in the preset positions and can be moved in the adjustment path of the stop body to delineate the adjustment path, at least one of the movable stops disposed within a cylinder housing that is disposed at a right angle to the stop body; and
control means for moving the movable stop in the cylinder housing between a position of readiness outside of the adjustment path and a working position inside the adjustment path for delimiting the adjustment of the guide railing.

30. Actuator drive according to claim 29, wherein at least two stops are provided.

31. Actuator drive according to claim 29, and at least one opposing stop which can be brought into contact with the stops and which follows the adjusting movement arranged in the adjustment path.

32. Actuator drive according to claim 31, wherein the opposing stop has at least two stop faces facing away from one another, as based on the adjustment path.

33. Actuator drive according to claim 29, wherein the actuator drive is a linear drive formed as a double-acting pneumatic cylinder having a cylinder element which has a cylinder body and a piston rod, and the preset positions are assigned to the pneumatic cylinder and comprise a stop mount which is attached to the cylinder element in the axial direction.

34. Actuator drive according to claim 33, wherein the preset positions comprise multiple bores in the stop mount offset in an axial direction.

35. Actuator drive according to claim 34, wherein the form of multiple bores comprises at least two rows with an arrangement of bores that are offset in relation to one another in the axial direction of the stop mount.

36. Actuator drive according to claim 33, wherein the stops can be screwed into threaded bores in the stop mount.

37. Actuator drive according to claim 33, wherein the stop mount has an axial bore aligned with the cylinder body.

38. Actuator drive according to claim 37, wherein the axial bore is arranged coaxially with the piston rod and with the piston rod passing through the axial bore at least partially.

39. Actuator drive according to claim 37, wherein the inside diameter of the axial bore is greater than the outside diameter of the piston rod and an annular space is formed therebetween.

40. Actuator drive according to claim 39, wherein the bores are assigned to the annular space to accommodate the stops such that the stops pass through the annular space approximately perpendicularly to the longitudinal extent thereof when in the position of readiness or the working position.

41. Actuator drive according to claim 33, wherein the stop mount has a centering shoulder which engages in the cylinder head in a form-fitting manner.

42. Actuator drive according to claim 33, and an the opposing stop which is attached to the piston rod and is guided in the interior of the stop mount.

43. Actuator drive according to claim 42, wherein the piston rod is displaceable with the opposing stop over the entire length of the stop mount.

44. Actuator drive according to claim 29, wherein the preset positions comprise recesses into which the stops can be inserted in a form-fitting manner.

45. Conveyor line according to claim 44, wherein the recesses are formed as bores.

46. Actuator drive according to claim 29, wherein the stops comprise one of form-fitting screw or plug elements.

47. Actuator drive according to claim 46, wherein the stops are designed as pins.

48. Actuator drive according to claim 29, wherein each of the stops comprises a pneumatic cylinder that can be operated by the control means.

49. Conveyor line for products such as bottles, cans or similar containers, comprising: at least one guide railing which is adjustable along an adjustment pathway across a direction of conveyance and is operable by at least one actuator drive;
a plurality of movable stops that are optionally introducible at one or more preset positions in the adjustment pathway of the guide railing to delimit the at least one guide railing and define various railing positions, at least one of the movable stops disposed within a cylinder housing that is disposed at a right angle to the actuator drive; and
control means for moving the movable stop in the cylinder housing between a position of readiness outside of the adjustment pathway and a working position inside the adjustment pathway for delimiting the adjustment of the guide railing, wherein the products to be transported have a collar by means of which they are transported suspended on two parallel sliding rails which run with a distance therebetween, and a nozzle channel running in the direction of conveyance having blow nozzles aimed at the products in the direction of conveyance.

* * * * *